United States Patent [19]

Nishiguchi

[11] Patent Number: 4,585,083
[45] Date of Patent: Apr. 29, 1986

[54] MECHANISM FOR DETECTING LOAD

[75] Inventor: Yuzuru Nishiguchi, Tokyo, Japan

[73] Assignee: Shinko Denshi Company Ltd., Tokyo, Japan

[21] Appl. No.: 663,948

[22] Filed: Oct. 23, 1984

[30] Foreign Application Priority Data

Nov. 1, 1983 [JP] Japan ................................ 58-205428
Apr. 11, 1984 [JP] Japan .................................. 59-71960

[51] Int. Cl.⁴ ...................... G01G 3/08; G01G 23/06; G01G 23/02
[52] U.S. Cl. .................................... 177/229; 177/154; 177/255
[58] Field of Search ............... 177/154, 187, 231, 255, 177/229

[56] References Cited
U.S. PATENT DOCUMENTS

3,443,653  5/1969  Marshall ..................... 177/231 X
4,433,742  2/1984  Lee ........................... 177/229
4,497,386  2/1985  Meier ......................... 177/154 X
4,526,247  7/1985  EeerNise et al. ............. 177/229 X Primary Examiner—E. A. Goldberg
Assistant Examiner—Patrick W. Foster
Attorney, Agent, or Firm—James W. Hellwege

[57] ABSTRACT

A mechanism for detecting a load including a load shaft connected to a pan receiving rod and extending vertically, a first arm plate having integrally formed arms whose one ends are connected to each other, a second arm plate having integrally formed arms whose one ends are connected to each other, and a vertical link connected between the one ends of the arms of first and second arm plates, the other ends of the arms of first and second arm plates being connected to the load shaft and to a fixed member. When a load is applied to the load shaft, the load shaft is moved linearly in the vertical direction without being affected by a force exerted to the load shaft in the horizontal direction.

19 Claims, 18 Drawing Figures

MECHANISM FOR DETECTING LOAD

BACKGROUND OF THE INVENTION

The present invention relates to a mechanism for detecting a load, and more particularly to a linear movement type load detecting mechanism for use in a top loading scale.

In general, a condition required for the load detecting mechanism is to measure faithfully a force exerting only in a measuring direction. That is to say, when a force is applied perpendicularly to the measuring direction, the mechanism must resist it and a measured result should not be affected at all. Particularly, for the top loading scale even if a load is applied at an off-center position of a weighing pan, a so-called shift error should not occur.

Figure 1:
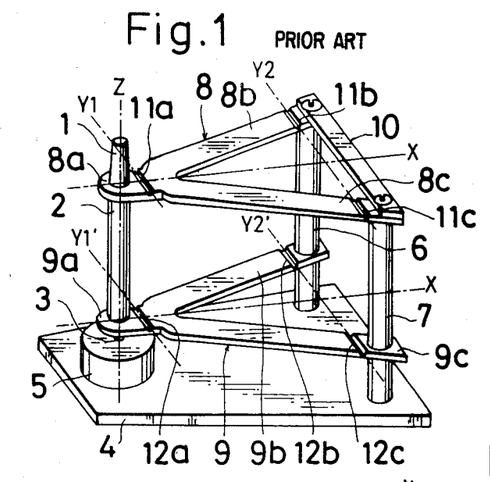
FIG. 1 is a perspective view showing the construction of a known load detector using the Roberval mechanism.

FIG. 1 shows a typical example of a known load detecting mechanism for use in the top loading scale. In FIG. 1, on a top of a pan receiving rod 1 is placed a pan not shown. To the rod is applied a detecting load due to the gravitational force exerting in a Z axis. The pan receiving rod 1 is extended below as a load shaft 2 and its lower end 3 is connected to a load cell 5 placed on a base 4. The load cell 5 may be generally formed by a suitable load transducer having a small displacement such as strain gauges, electromagnetic force balance mechanism, tuning fork vibrator, vibrating string and gyroscope. On the base 4 there are secured two posts 6 and 7, and two V-shaped arms 8 and 9 constituting Roberval mechanisms are supported by the posts 6, 7 and load shaft 2 one above the other in parallel with each other in such a manner that root portions 8a and 9a of arms are secured to the load shaft 2, and branch ends 8b, 8c and 9b, 9c of arms are secured to the posts 6 and 7. Between upper ends of the posts 6 and 7 is arranged a reinforcing bar 10. The V-shaped arms 8 and 9 are formed to have a sufficient stiffness, but near the root portions and front ends are formed flexures 11a, 11b, 11c, 12a, 12b, 12c serving as flexible hinges so that the arms can be relatively freely bent at these portions.

An operation of the known mechanism will be explained with reference to FIG. 2. The link mechanism forms a parallelogram consisting of four link members or apexes at the flexures 11a, 11b, 12a and 12b. Since the positions of the flexures 11b and 12b are selected as fixed points, the weighing pan and load shaft 2 secured to the movable flexures 11a and 12a can move only circularly as shown by double headed arrows. When a load W is applied on the pan 13 at a position deviated from the center of pan in an X direction, compression force and tension force are applied to the arms 8 and 9, respectively, but as long as the arms are in parallel with each other, even if they are not arranged precisely in horizon, vertical components due to the compression and tension forces are cancelled out each other, so that only the force exerting in the axial direction, i.e. the vertical direction can be transmitted to the load shaft 2.

However, the known detecting mechanism shown in FIG. 1 has the following disadvantages.

(a) The mechanism has a relatively small resistance against a force exerting horizontally to the pan receiving rod 1 and might respond differently to said force, and further the Roberval mechanism is liable to twist in response to a force exerting at the root portion 8a of arm 8 in a direction Y1 perpendicular to the longitudinal direction X.

(b) When elongated hinges forming the flexures 11a to 11c, 12a to 12c are not in parallel with each other in directions Y1 and Y2, and Y1' and Y2', there might be produced the shift error due to the deviated load.

(c) When the branch portions of arms 8 and 9 are not precisely in parallel with each other, there might be produced the shift error due to the load deviated mainly in the X direction.

(d) Since the load shaft 2 is moved circularly, while it is remained vertically, the load shaft 2 moves not only in the vertical direction, but also in the horizontal direction to a small extent. Therefore, undesired horizontal force is applied to the load cell and thus a measuring error might occur. This results in that use could not be made of a load cell having a large displacement, and even if the load cell with the small displacement is used, between the load shaft 2 and load cell 5 there could not be provided a spring or damper having a large displacement for absorbing and mitigating shock and overload upon applying the load W on the pan.

In order to solve the above problems of the known technique, the inventor has proposed, in Japanese Patent Application Laid-open Publication No. 94,016/84, a load detecting mechanism in which a load shaft is moved linearly. However, this mechanism has another drawback that the load shaft is not only moved linearly, but also is rotated about its axis and that some parts thereof are difficult to manufacture.

SUMMARY OF THE INVENTION

The present invention has for its object to provide a load detecting mechanism which can remove the above mentioned drawbacks, which can utilize a load cell having a large displacement due to the fact that a load shaft can be moved completely linearly, which can provide a freedom to arrange a damping spring between the load shaft and load cell, which can resist any load deviated in the horizontal direction so that any shift error is hardly produced and further which can be manufactured easily.

According to the invention, a mechanism for detecting a load comprises means including a load shaft member extending in a first direction in which a load to be directed is exerted; and means including at least one double link mechanism which comprises a common link member extending substantially in parallel with said load shaft member, first and second arm members each of which extends in a second direction substantially perpendicular to said first direction, one and the other ends of said first arm member being connected to one ends of said load shaft member and common link member, respectively and one and the other ends of said second arm member being connected to the other ends of said load shaft member and common link member, respectively, third and fourth arm members extending substantially in parallel with said first and second arm members, respectively, one ends of said third and fourth arm members being connected to said one and the other ends of said common link member, respectively and the other ends of said third and fourth arm members being connected to a fixed member near said load shaft member, and flexure members formed in said first, second, third and fourth arm members at said one and the other ends thereof, whereby said first and second arm members and common link member form a first parallelogram link mechanism and said third and fourth arm members and common link member form a second parallelogram link mechanism having substantially same dimension as that of the first parallelogram link mechanism.

BRIEF DESCRIPTION OF THE DRAWINGS

FIGS. 5 ad 6 are schematic views for explaining how to avoid the shift error in the mechanism according to the invention;

DESCRIPTION OF THE PREFERRED EMBODIMENTS

Figures 2, 3:
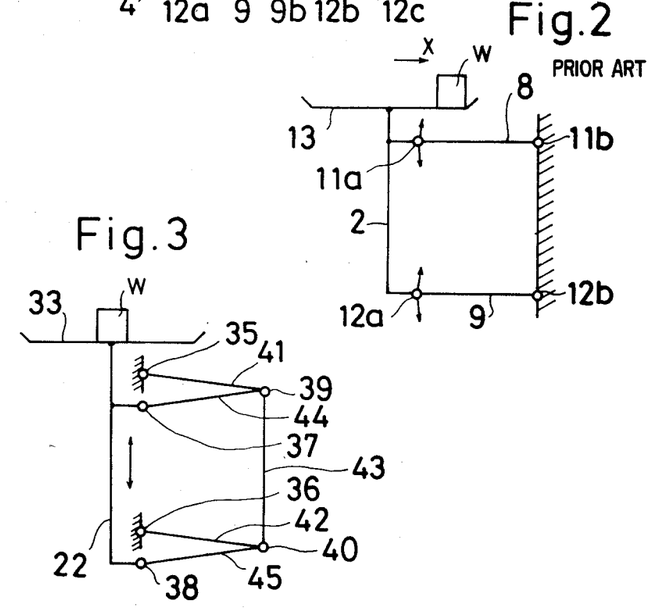
FIG. 2 is a schematic view for explaining the operational principle of the known mechanism.
FIGS. 3 and 4 are schematic views illustrating a principal construction of the load detecting mechanism according to the invention.

FIG. 3 is a schematic view showing a principal construction of the load detecting mechanism according to the invention. The mechanism comprising a double link mechanism forming two parallelogram link mechanisms of the same dimension having six apexes at flexures 35 to 40. The first link mechanism is composed of two horizontal arms 41, 42 and a vertical link 43 and has four apexes at the flexures 35, 36, 39 and 40. The flexures 35 and 36 opposite to the vertical link 43 are positioned fixedly and situate near a center of the whole mechanism, i.e. a load shaft 22. This construction of the link mechanism is largely different from the known mechanism. The second link mechanism is formed by two horizontal arms 44, 45 and the vertical link 43 and has four apexes at the flexures 37, 38, 39 and 40. The flexures 39 , 40 and vertical link 43 are principally common to the first and second link mechanisms, and the flexures 37 and 38 opposite to the vertical link 43 are secured to the load shaft 22.

In the principal construction of the mechanism according to the invention shown in FIG. 3, when a load W is applied on a weighing pan 33 connected to the load shaft 22, the load shaft 22 moves linearly in the vertical direction as long as the flexures 35 to 40 have the same resistance against the rotational force. In this case, if the spring property of the flexures is good, the scale of linear movement type can be obtained. Further, the load shaft 22 may be coupled with a load cell or the movement of the load shaft 22 may be transmitted to a linear movement type displacement transducer.

Figure 4:
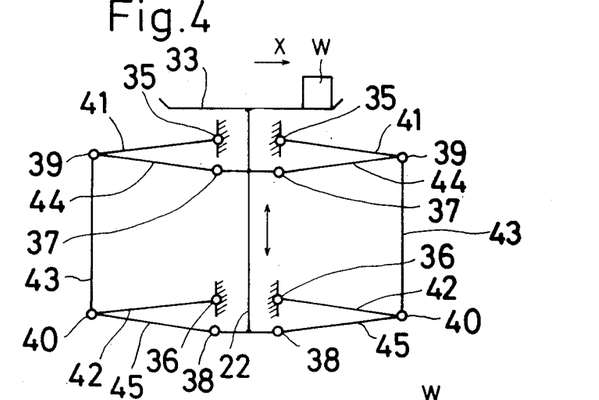

Even if the flexures have different resistances against the rotational force, when two sets of double link mechanisms each being formed by two parallelogram links as illustrated in FIG. 3 are provided symmetrically about the load shaft 22 as shown in FIG. 4, the load shaft 22 can be moved only linearly along its axial direction as shown by a double headed arrow in FIG. 4.

Figures 5, 6:
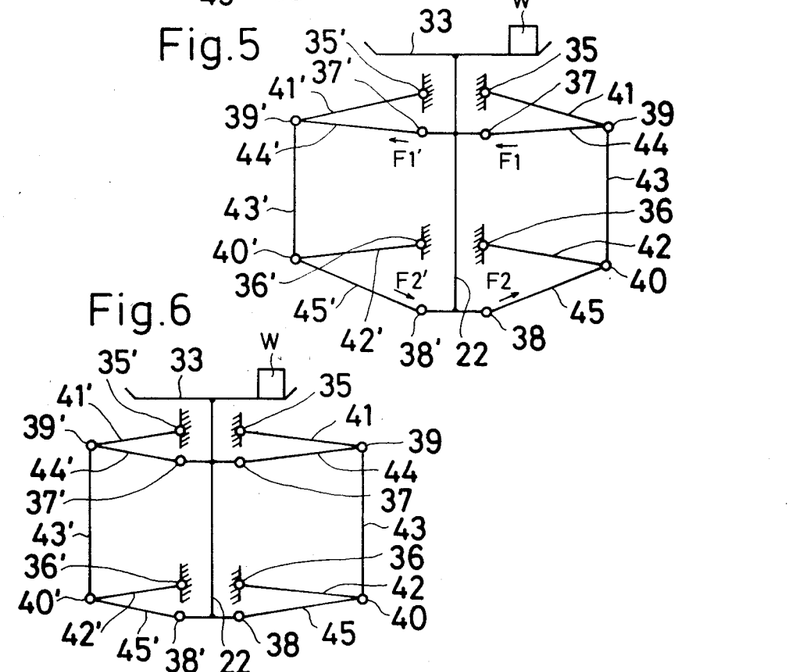

FIG. 5 shows a principal construction of the mechanism according to the invention, in which four link mechanism are arranged symmetrically to the center axis. For the sake of explanation, each link mechanisms are shown to be largely deviated or deformed from the parallelogram due to manufacturing error. If the link mechanisms were actually deviated to such a large extent, the weighing pan 33 and load shaft 22 could never move smoothly. Therefore, the problem of shift error will be explained while taking into mind a very small deviation due to the manufacturing error.

When a load W is applied on the weighing pan 33 at its periphery as illustrated in FIG. 5, the tension and compression forces are applied to respective arms forming the link mechanism and then forces F1, F1', F2, F2' are applied to the arms at the flexures 37, 37', 38, 38'.

When comparing the mechanisms shown in FIGS. 4 and 5 with the known mechanism illustrated in FIG. 2, in the known mechanism it is absolutely necessary that the arms 8 and 9 are made precisely in parallel with each other in order to remove the shift error, whereas in the mechanism according to the invention it is not always necessary to satisfy this condition. This is due to the following facts. If the arms 44 and 45 are not made in parallel with each other, vertical components of the forces F1 and F2 are not equal to each other and thus are not cancelled out each other. However, the vertical components of the forces F1 and F1' have equal magnitude and opposite directions and therefore they are cancelled out each other. Similarly the vertical components of the forces F2 and F2' are also cancelled out each other. Therefore, the vertical components of the forces F1, F2, F1' and F2' caused by the tension and compression forces due to the deviated load are completely cancelled out and do not act upon the load shaft 22 as a whole, so that the shift error is not produced.

As explained above, according to the invention, it is preferable that the double link mechanisms are arranged symmetrically about the load shaft 22. However, it should be noted that the double link mechanisms having asymmetrical configurations may be used. For instance, the double link mechanisms may comprise arms having different lengths as illustrated in FIG. 6. In such a mechanism, the operation for removing the shift error explained above with reference to FIG. 5 is not applied as it is, and the arms 41 and 44 have to be made in parallel with the corresponding arms 42 and 45 , respectively.

In the embodiments so for explained, the mechanism comprises a pair of the double link mechanisms which are arranged subtantially symmetrically to the load shaft 2 and each of which comprises the common vertical link 43 and a pair of parallelogram links. According to the principal aspect of the present invention, two or more double link mechanisms may be arranged at equal angles about the load shaft or symmetrically with respect to the load shaft and in preferable embodiments there are provided three or four sets of the double link mechanisms.

Figure 7A:
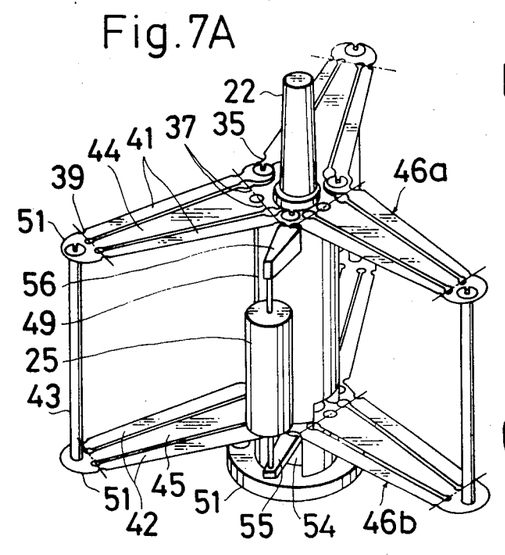
FIGS. 7A and 7B are perspective views depicting an embodiment of the mechanism according to the invention.
Figure 7B:
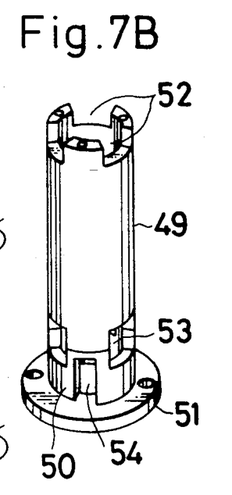
Figures 8A, 8B:
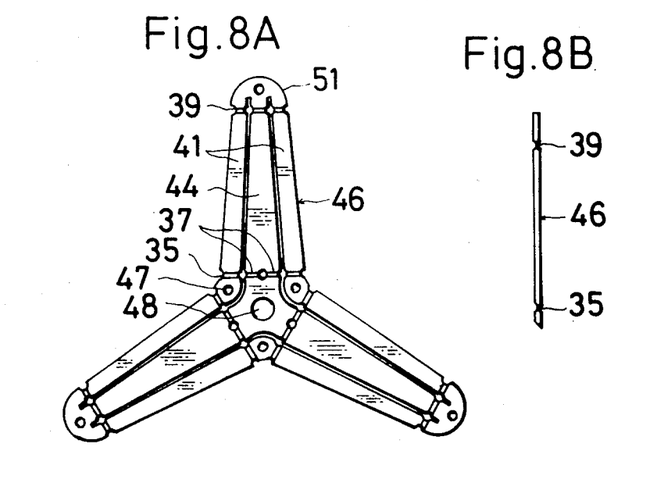
FIGS. 8A and 8B are plan and side views showing an embodiment of the arm plate according to the invention.

FIG. 7 shows an embodiment of the weight detecting mechanism according to the invention. Prior to explaining the present embodiment, a trifurcate arm plate serving as an important constructional element will be first explained with reference to FIGS. 8 and 9. In FIG. 8A, a trifurcate arm plate 46 is formed integrally from a resilient sheet. Outer arms 41 are connected to an inner arm 44 at their front ends 51, but are completely separated from the inner arm at remaining portions. Such an arm plate 46 may be manufactured by press-cutting, wire-cutting, etching, etc. The arm plate 46 comprises three fitting holes 47 and a center hole 48. When the arm plate 46 is fixed at the fitting holes 47 and a central portion surrounding the center hole 48 is pulled upward, the central portion is moved linearly in a vertical direction with respect to the plane of the drawing of FIG. 8A. The resilient sheet from which the arm plate 46 is formed has such a thickness that the arm plate 46 can show a large resistance against the compression, extension and bending. Further near the front ends and root portions there are formed flexures 39 and 35, 37 by making the thickness thin partially by means of the pressing as illustrated in a side view of FIG. 8B. The flexures are formed perpendicularly to the extending direction of the arms. The two outer arms 41, 41 extending substantially in parallel with each other form the first horizontal arm of the link mechanism and the inner arm 44 constitutes the second horizontal arm. The basic function of the two outer arms 41, 41 is entirely same as that of the single horizontal arm. Therefore, one of the outer arms 41, 41 may be deleted. However, in practice, it is preferable for the stable operation to form the first horizontal arm of the link mechanism from a pair of substantially parallel arms as shown in FIG. 8A. In the embodiment which will be explained later with reference to FIG. 7, a pair of such trifurcate arm plates 46 having the same dimension are arranged one above the other.

Figure 9:
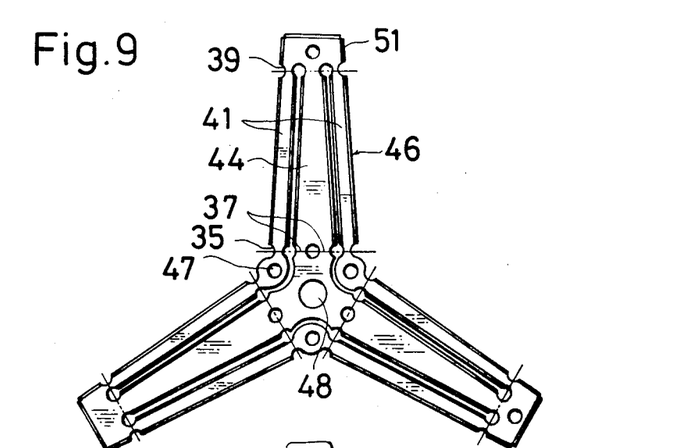
FIG. 9 is a plan view illustrating another embodiment of the arm plate.

FIG. 9 shows another embodiment of the trifurcate arm plate according to the invention similar to that illustrated in FIG. 8. In the present embodiment, the arm plate is formed by a very thin resilient sheet and flexures 35, 37 and 39 are formed by simply narrowing widths at relevant portions. Further, in order to increase the resistance against the compression and bending in the longitudinal directions of arms, the arms 41 and 44 are bent along their one or both side edges. By means of such a construction, the trifurcate arm plates 46 having the same dimension and property can be manufactured simply and cheaply only by pressing on a mass production scale.

In the embodiment of the load detecting mechanism shown in FIG. 7A, a pair of the trifurcate arm plates 46a and 46b are arranged one above the other. The center portions of the outer arms 41 of the upper arm plate 46a are secured to an upper end surface of a supporting pipe 49 at the three fitting holes 47. The center portions of the outer arms of the lower arm plate 46b are clamped between the lower end surface of supporting pipe 49 and a base 51 including a tubular portion 50 which has a diameter equal to that of the supporting pipe 49 and is connected to the latter. The lower arm plate 46b may be connected to the pipe 49 by means of screws. The center portion of the inner arm 44 of upper arm plate 46a is secured to an upper part of the load shaft 22 at the fitting hole 48. The center portion of the inner arms 45 of the lower arm plate 46b is secured to a lower part of the load shaft 22 at the fitting hole 48. Therefore, the load shaft 22 and the center portions of upper and lower arm plates 46a and 46b can move linearly along the longitudinal axis freely passing through the supporting pipe 49. The front ends 51 of the arms 41 and 44, 45 of the upper and lower arm plates 46a and 46b are coupled with each other by means of three vertical links 43 to form three sets of double link mechanisms.

As depicted in FIG. 7B, in the upper and lower end surfaces of the supporting pipe 49 are formed three recesses 52 and 53, respectively. These recesses form spaces allowing the up and down movement of the center portions of inner arms 44 and 45 of upper and lower arm plates 46a and 46b in accordance with the movement of the load shaft 22. The depth of the recesses determines the maximum allowable displacement of the load shaft 22. In the tubular portion 50 of the base 51, there is formed a recess 54 serving as a window from which the movement of the load shaft 22 can be taken out. As shown in FIG. 7A, a lower supporting member 55 having one end connected to the load shaft 22 is extended through the recess 54, and an upper supporting member 56 is secured to the upper part of the supporting pipe 49. Between the lower and upper supporting members 55 and 56 is arranged a load cell 25. In the load detecting mechanism according to the present embodiment, the tension or compression force applied axially to the load shaft 22 can be correctly transferred to the load cell 25.

Figure 10:
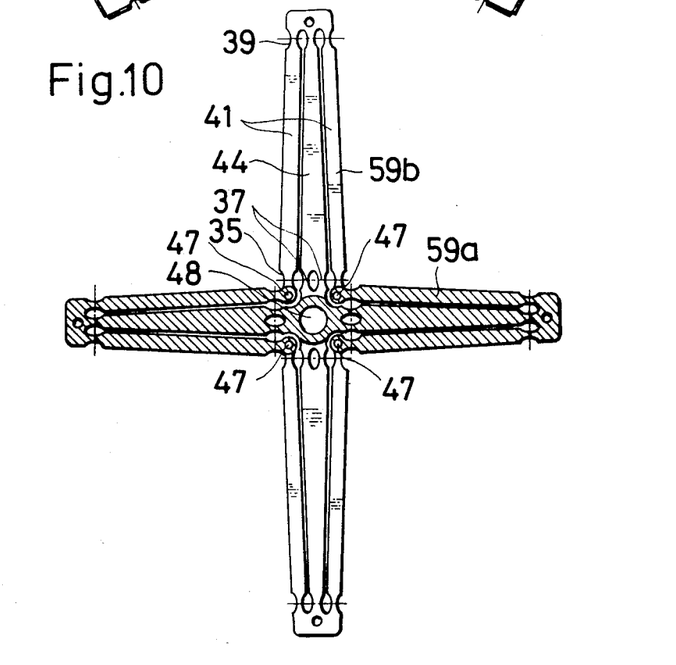
FIG. 10 is a plan view showing another embodiment of the arm plate according to the invention.

The embodiment shown in FIG. 7 using a pair of trifurcate arm plates 46a and 46b formed symmetrically with respect to the axis illustrated in FIGS. 8 and 9 is preferable for a small scale with a top loading pan. In case of manufacturing from a resilient sheet a trifurcate arm plate of large size for use in a large scale with a top loading pan, there will be produced a large amount of loss of the resilient sheet material. In such a case, it is preferable to constitute a crossed arm plate by placing two strip-shaped arm plates 59a and 59b formed symmetrically with respect to the axis one upon the other as shown in FIG. 10. It should be noted that if the loss of material is ignored, the crossed arm plate may be integrally formed from a single resilient sheet.

In FIG. 10, a strip-shaped arm plate 59a shown by hatching and a strip-shaped arm plate 59b slightly longer than the arm plate 59a are crossed with each other at right angles and are secured to the supporting pipe 49 at four fitting holes 47 by means of screws. The arm plates 59a and 59b may have the same dimension or may have different dimensions as shown in FIG. 10 in accordance with the shape and dimension of the weighing pan 33 or use. Further in case of weighing small weights or in special uses two strip-shaped arm plates having a shorter length and a wider width may be arranged one above the other and in parallel with each other in a manner similar to the principal construction shown in FIG. 3. The whole construction of the load detecting mechanism using the strip-shaped or crossed arm plate can be easily understood from the above explanation with reference to FIG. 7A and thus explanation is omitted.

Figure 11:
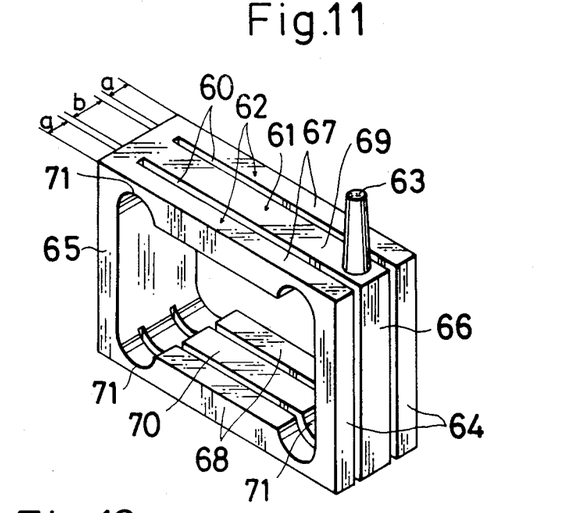
FIGS. 11 and 12 are perspective views illustrating another embodiment of the mechanism according to the invention which is manufactured from a single metal block.

FIG. 11 is a perspective view showing another embodiment of the load detecting mechanism according to the invention, which embodiment corresponds to the principal construction illustrated in FIG. 3. The mechanism comprises the double link mechanism formed integrally by cutting away a central portion of a parallelogram metal block. In the metal block there are formed two parallel slits 60, 60 extending in a direction in which the block extends to form a center movable link mechanism 61 and outer fixed link mechanisms 62, 62 on both sides of the movable link mechanism 61. In order that flexures have the equal resistance against the rotational force, a width b of the movable link mechanism 61 is preferably set to a twice of a width a of each fixed link mechanism 62. It should be noted that slits 60, 60 are cut in such a manner that one side of the parallelogram becomes a common side and the remaining sides are separated into three parts. On a free end of the movable link mechanism 61 is secured a pan receiving rod 63, and vertical sides 64, 64 of the fixed link mechanisms 62, 62 are secured to a fixed body not shown. Therefore, these vertical sides 64, 64 serve as a fixed member.

Comparing the mechanism of FIG. 11 with that of FIG. 7, it is apparent that a vertical side 65 common to the movable and fixed link mechanisms 61 and 62, 62 corresponds to the vertical link 43 and a vertical side 66 of the movable link mechanism 61 to which side is secured the pan receiving rod 63 serves as the load shaft 22. Further upper sides 67, 67 of the fixed link mechanisms 62, 62 correspond to the upper horizonal arms 41, 41 lower sides 68, 68 correspond to the lower horizontal arms 42, 42 upper horizontal side 69 of the movable link mechanism 61 corresponds to the horizontal arm 44, and a lower side 70 corresponds to the horizontal arm 45. Thin portions 71 near both ends of each sides correspond to flexures 35, 37 and 39.

Figure 12:
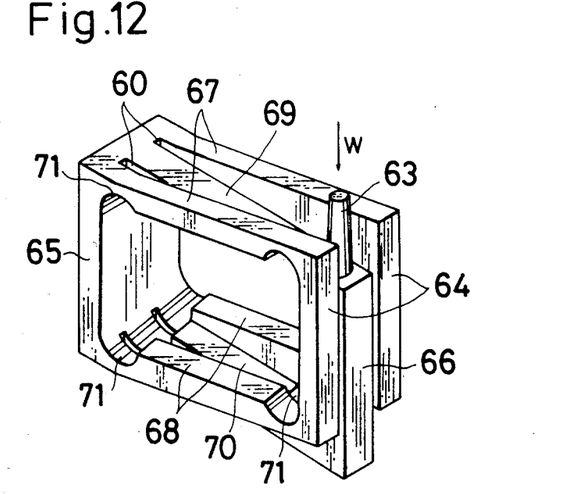

The double link mechanism of the present embodiment is formed integrally from a single metal block, and therefore it can resist the horizontal force and twisting force. Further the sides 67 to 70 can be easily made in parallel with each other. When a load W is applied to the pan receiving rod 63 and thus the load shaft side 66 as illustrated in FIG. 12, the load shaft side 66 is moved downward substantially linearly with respect to the vertical shaft sides 64, 64 of the fixed link mechanisms 62, 62. Therefore, by measuring the displacement of the load shaft side 66 with the aid of a load cell, a differential transformer, etc., it is possible to detect the load W in a precise manner.

Figure 13:
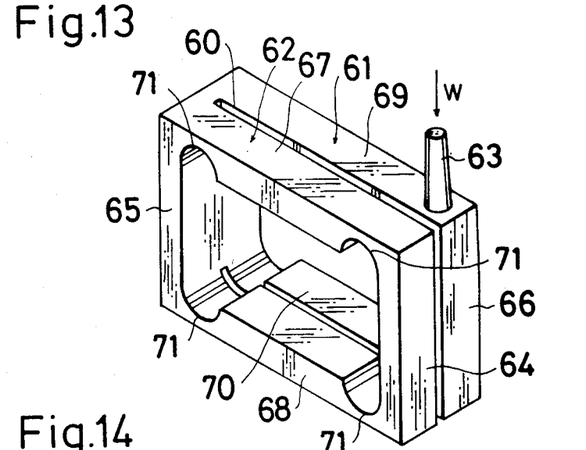
FIG. 13 is a perspective view depicting another embodiment of the mechanism according to the invention.

FIG. 13 is a perspective view showing another embodiment of the mechanism according to the invention. In the present embodiment, in a metal block whose central portion has been cut away there is formed only a single slit 60 to form a fixed link mechanism 62 and a movable link mechanism 61. The principle of the construction and the operational function of the mechanism of the present embodiment are same as those explained with reference to FIG. 11.

Figure 14:
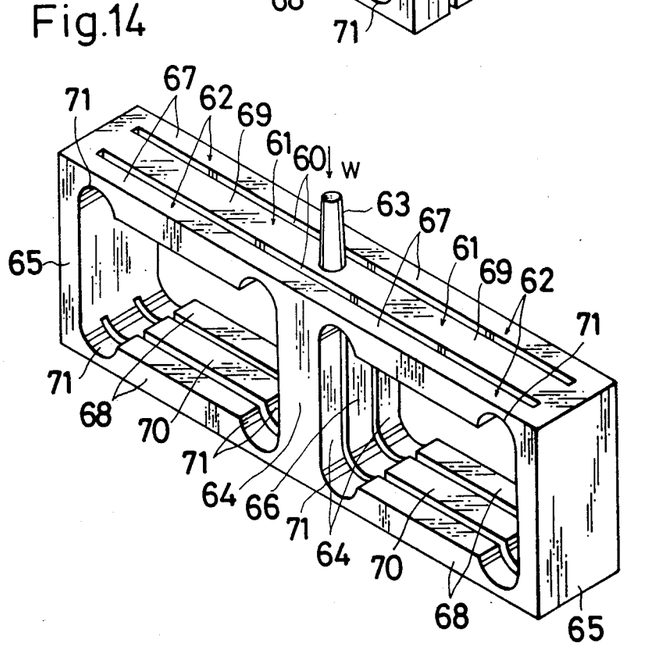
FIG. 14 is a perspective view showing another embodiment of the mechanism according to the invention.

In the embodiments illustrated in FIGS. 11 and 13, if the resistances of respective flexures 71 against the rotational force are not equal to each other, the load shaft side 66 is moved not only linearly, but also circularly. However, this circular movement of the load shaft side can be completely removed by an embodiment shown in FIG. 14 in which a pair of the double link mechanisms are provided. In this embodiment, in an elongated metal block there are first formed two substantially rectangular openings and then a pair of parallel slits 60, 60 are formed in such a manner that a pair of the double link mechanisms shown in FIG. 11 are formed symmetrically with respect to a vertical axis along which a pan receiving rod 63 extends. The vertical shaft sides 64, 64 of the fixed link mechanisms 62, 62 and the load shaft side 66 of the movable link mechanism 61 are common to the right and left double link mechanisms. The principal construction of the mechanism of the present embodiment is identical with that shown in FIG. 4.

In the embodiments shown in FIGS. 11 to 14, the mechanism composed of a single double link mechanism or a pair of double link mechanisms arranged symmetrically with respect to the axis is explained. According to the invention, three or more sets of the double link mechanisms may be arranged symmetrically to the load shaft. In such a case, the shift error and the influence of undesired force exerting at right angles to the load shaft can be effectively removed.

Figures 15A, 15B:
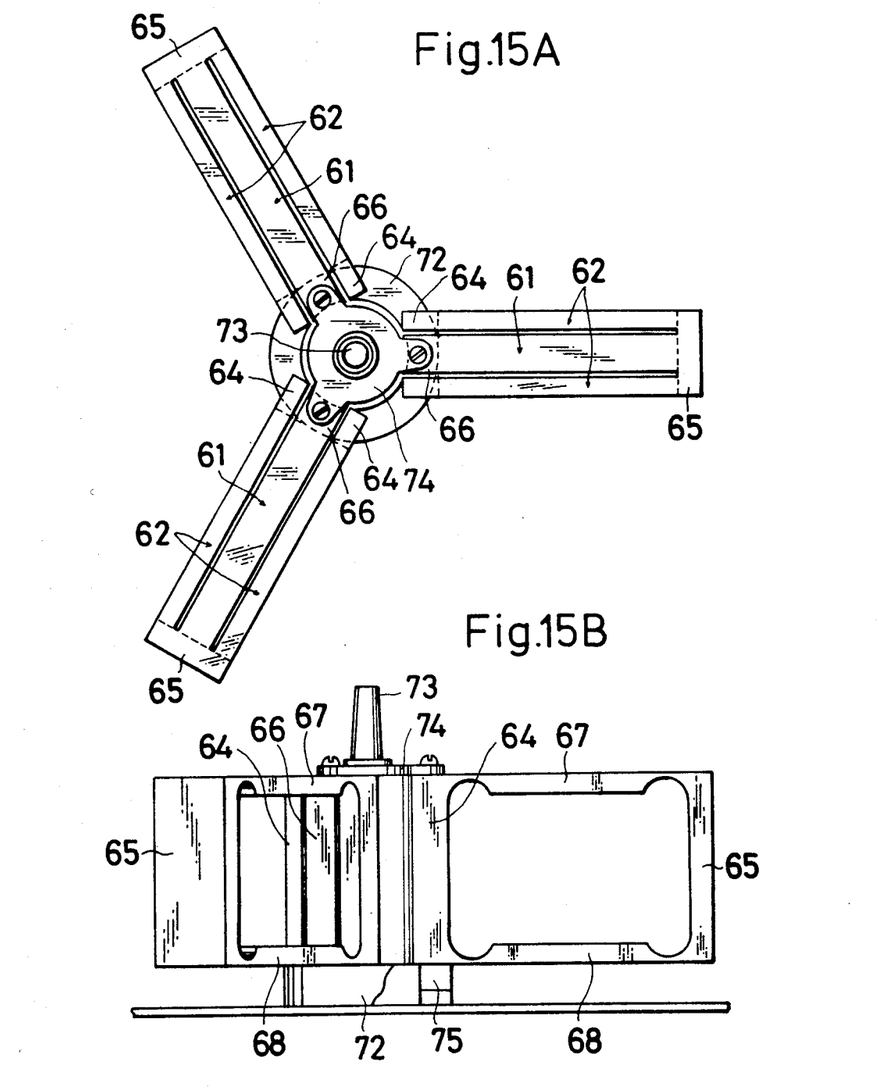
FIGS. 15A and 15B are plan and front views illustrating still another embodiment of the mechanism according to the invention in which three sets of double link mechanisms each being formed from a metal block are arranged symmetrically about a load shaft axis.

FIGS. 15A and 15B illustrate another embodiment of the mechanism according to the invention, in which three sets of the double link mechanisms are arranged at equal angles about the load shaft axis. Vertical shaft sides 64, 64 of fixed link mechanisms 62 are fixed to a short tubular base 72 and load shaft sides 66 of movable link mechanisms 61 are connected to each other at their upper ends by means of a coupling plate 74 on which a pan receiving rod 73 is secured. In the base 72 there is formed a recess 75 which allows the downward movement of the load shaft sides 66. The operation of the mechanism of the present embodiment is substantially same as that of the previous embodiments, and particularly the mechanism of the present embodiment is superior in resisting a disturbing horizontal force exerted in any direction.

The merits of the load detecting mechanism according to the invention explained above will be summarized as follows.

(1) Since the resistance against undesired horizontal forces applied to the load shaft in any direction is large, the mechanism is hardly damaged by shock and does hardly produce the shift error. In an application in which the load is deviated largaly in a certain direction, the shift error can be effectively avoided by suitably selecting the length of the arms.

(2) Even if the directions of the flexures are not completely in parallel with each other, no shift error is produced by the load deviated in an extended direction parallel to any one of the directions of the flexures. This is mainly due to the fact that the deviated load is mainly supported by other arm which is crossed with the relevant arm at right angles or 120 degrees.

(3) When the parallelogram link mechanisms are arranged symmetrically to the load shaft axis, there is not produced the shift error even if the upper and lower corresponding arms are not precisely in parallel with each other.

(4) Since the load shaft can take place the complete linear movement, it is possible to use the load cell having the large displacement. Further, to the load cell is not applied any undesired force perpendicular to the load direction, and thus the load can be detected highly accurately.

(5) Since the damping spring or damper may be arranged between the load shaft and load cell, even if a load cell having the smaller displacement is used, it can be effectively protected against the damage. Moreover, since the displacement of the load shaft can be made large, it is simply possible to prevent any overload from being applied to the load cell by providing a mechanical stopper for the displacement of the load shaft upon the application of the overload.

(6) In the known mechanism, the lengths of the posts 6 and 7 shown in FIG. 1 which require the large strength have to be adjusted precisely in order to reduce the shift error, and therefore the adjusting mechanism and method are very complicated and difficulat. Contrary to this, according to the invention the adjustment can be effected by merely adjusting the lengths of the vertical links to which is applied no force theoretically and thus can be performed by using, for example, a fine differential screw. Therefore, the mechanism can be manufactured simply and the adjustment for the shift error correction can be done easily.

(7) In the known mechanism, since the whole detecting mechanism is secured to the base 4 having a large area as illustrated in FIG. 1, if the base 4 is distorted sue to a large or deviated load, there might be produced error in the measurement. However, the whole detection mechanism according to the invention is supported by the base having a small area and therefore even if a bottom plate of a scale is distorted there is not produced error in the measurement. This results in that the detecting mechanism can be installed in a light and cheap casing having a small thickness.

(8) The arm plates constituting the important component of the mechanism can be manufactured economically on the mass production scale, for example, by means of the pressing. Further the parts of the mechanism can be composed easily.

The merits so far explained are those which could be obtained when the load detecting mechanism is applied to the scale with a top loading pan. The mechanism according to the invention has the following merits when applied to other machines.

(9) When the load shaft 22 is arranged horizontally, the mechanism may be utilized as an inclinometer or as an instrument for measuring a horizontal load and acceleration of vibration. In this case, even if large disturbing force components are applied to the load shaft 22 at right angles thereto, only the acceleration and force in the axial direction can be detected accurately. As to the dynamic characteristics of the detecting mechanism, it is possible to use a load cell having a small displacement to increase the natural frequency or to use a load cell having a large displacement to decrease the natural frequency. Further, when the mechanism is combined with a differential transformer instead of the load cell, it is possible to obtain an instrument for detecting the displacemnt of vibration or an inclinometer of a type detecting the displacement.

(10) Further the mechanism according to the invention may be used not only as that for detecting the displacement and force, but also as the linear movement mechanism free from contact and friction.

Not only in electronic scales, but also in mechanical scales with a top loading pan, there have been used for many years the Roberval mechanism shown in FIGS. 1 and 2. The linear movement type load detecting mechanism according to the invention has many advantages over the known mechanism and can contribute to the progress and improvement in the scales and load detectors to a great extent.

What is claimed is:

1. A mechanism for detecting a load comprising means including a load shaft member extending in a first direction in which a load to be detected is exerted; and means including at least one double link mechanism which comprises a common link member extending substantially in parallel with said load shaft member, first and second arm members each of which extends in a second direction substantially perpendicular to said first direction, the ends of said first arm member being connected to one end of said load shaft member and one end of said common link member, respectively, and the ends of said second arm member being connected to opposite ends of said load shaft member and common link member, respectively, third and fourth arm members extending substantially in parallel with said first and second arm members, respectively, one end of said third and fourth arm members being connected to said ends of said common link member, respectively, and the opposite ends of said third and fourth arm members being connected to a fixed member positioned near said load shaft member, fifth and sixth arm members having one end of each connected to said ends of said common link member, respectively, and the opposite ends of each connected to a fixed member near said load shaft member, said first, third and fifth arm members and said second, fourth and sixth arm members being postioned in first and second planes, respectively, said first and second planes being perpendicular to a plane including said first and second directions, whereby said first and second arm members extend between said third and fifth arm members and between said fourth and sixth arm members, respectively, flexure members formed in each of said arm members at said ends thereof, whereby said first and second arm members and common link member form a first parallelogram link mechanism, said third and fourth arm members and common link member form a second parallelogram link mechanism having substantially the same dimension as that of the first parallelogram link mechanism, and said fifth and sixth arm members and common link member form a third parallelogram link mechanism having substantially the same dimension as that of the first parallelogram link mechanism.

2. A mechanism according to claim 1, wherein a plurality of double link mechanisms are arranged symmetrically about the load shaft member.

3. A mechanism according to claim 1, wherein said load shaft member, common link member and first, second, third, fourth, fifth and sixth arm members are integrally formed from a single metal block having formed therein at least one opening extending in said first and second planes and two parallel slits extending in the plane including siad first and second directions.

4. A mechanism according to claim 1 wherein said first, third and fifth arm members are integrally formed as a first arm plate which is cut out of a single resilient sheet, said second, fourth and sixth arm members are integrally formed as a second arm plates which is cut out of a single resilient sheet, and said first and second arm plates are arranged in said first and second planes, respectively.

5. A mechanism according to claim 2, wherein first and second double link mechanisms are arranged symmetrically about the load shaft member.

6. A mechanism according to claim 2, wherein first and second double link mechansims are arranged symmetrically about the load shaft member, first arm plates of the first and second double link mechanisms are formed integrally from a single resilient sheet, and second arm plates of the first and second double link mechanisms are formed integrally from a single resilient sheet.

7. A mechanism according to claim 2, wherein first, second and third double link mechanisms are arranged about the load shaft member at equal angles of 120 degrees.

8. A mechanism according to claim 2, wherein first, second and third double link mechanisms are arranged about the load shaft member at equal angles of 120 degrees, first arm plates of the first, second and third arm plates are formed integrally from a single resilient sheet, and second arm plates of the first, second and third arm plates are formed integrally from a single resilient sheet.

9. A mechanism according to claim 2, wherein first, second, third and fourth double link mechanisms are arranged symmetrically about the load shaft member.

10. A mechanism according to claim 2, wherein first, second, third and fourth double link mechanisms are arranged symmetrically about the load shaft member, first arm plates of the first and third diagonally opposing double link mechanisms are formed integrally from a single resilient sheet, first arm plates of the second and fourth diagonally opposing double link mechanisms are formed integrally from a single resilient sheet, second arm plates of the first and third double link mechanisms are formed integrally from a single resilient sheet, and second arm plates of the second and fourth double link mechanisms are formed integrally from a single resilient sheet, whereby said two integrally formed first arm plates are placed one upon the other at right angles and said two integrally formed second arm plates are placed one upon the other at right angles.

11. A mechanism according to claim 1, wherein each of said flexure members is formed by a thin or narrow portion of the arm plate.

12. A mechanism according to claim 1, wherein each of said first and second arm plates has side edges which are bent perpendicularly to said first and second planes, respectively.

13. A mechanism according to claim 10, wherein said integrally formed first and second arm plates of the first and third double link mechanisms have a length longer than that of the integrally formed first and second arm plates of the second and foruth double link mechanisms.

14. A mechanism according to claim 1, wherein said fixed member comprises a supporting pipe in which said load shaft member is extended and a base connected to one end of the supporting pipe, said first arm plates is secured to the other end of the supporting pipe as well as to the load shaft member near the other end of the supporting pipe, and said second arm plate is secured to said one end of the supporting pipe as well as to said load shaft member near the one end of the supporting pipe through at least one opening formed in the supporting pipe.

15. A mechanism according to claim 1 wherein said first direction is the vertical direction and said second direction is the horizontal direction.

16. A mechanism according to claim 1, wherein said metal block and opening have substantially rectangular shape and said metal block has formed therein two parallel slits extending along three sides of the rectangular block except for one side which forms said common link member, whereby a middle one of three sides opposite to said common link member forms said load shaft member and two outer sides are secured to the fixed member.

17. A mechanism accordng to claim 1, wherein said metal block has substantially elongated rectangular shape and has formed therein two openings of substantially rectangular shape and two parallel slits extending along three sides of the rectangular block except for two opposing sides which form the common link members of two double link mechanisms, whereby a middle one of three central portions form said load shaft member and the two outer centeral portions are secured to the fixed member.

18. A mechanism according to claim 2, wherein three metal blocks are arranged about the load shaft member at equal angles of 120 degrees.

19. A mechanism according to claim 3, wherein said first direction is the vertical direction and said second direction is the horizontal direction.

* * * * *